UNITED STATES PATENT OFFICE.

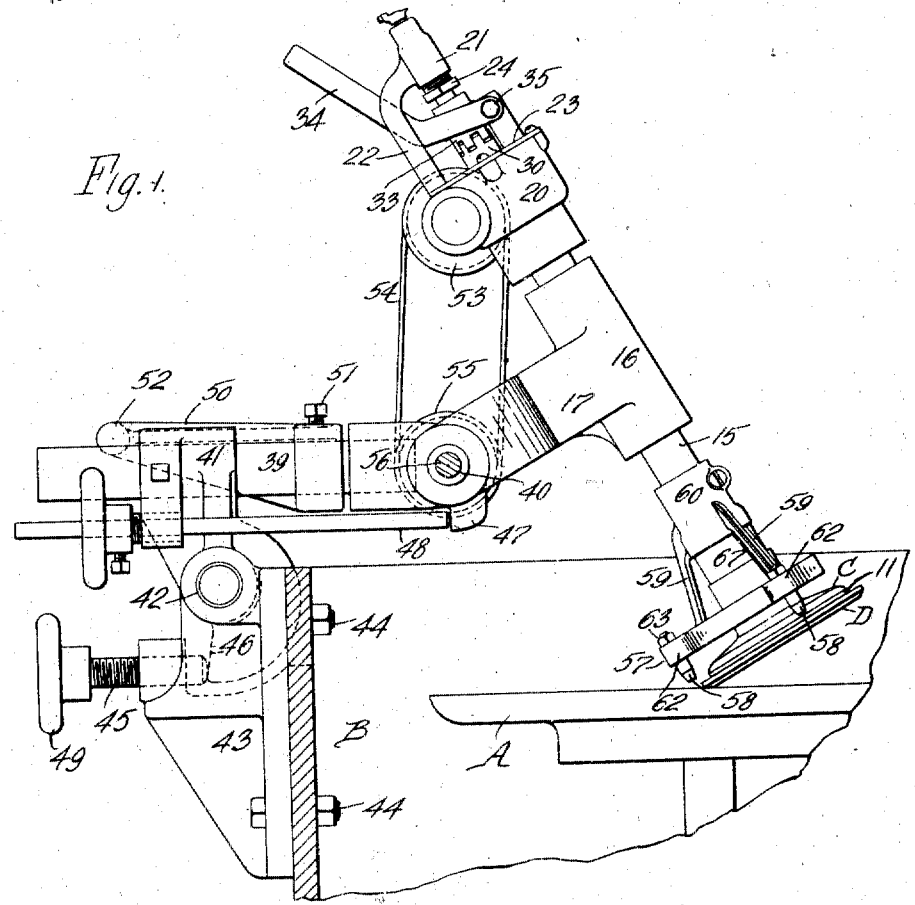

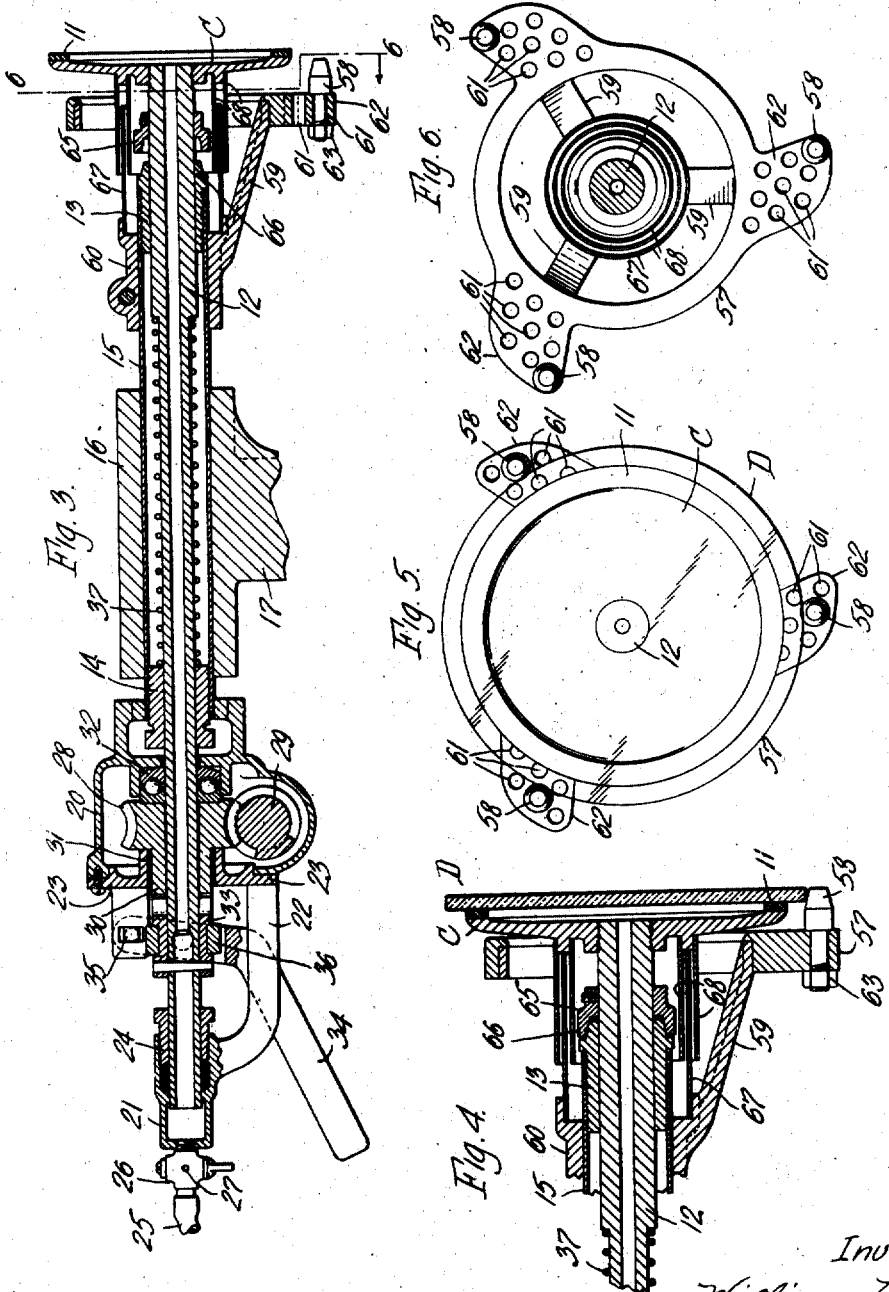

WILLIAM LA HODNY AND FRANK X. KIBITZ, OF BUFFALO, NEW YORK, ASSIGNORS TO STANDARD MIRROR CO., OF BUFFALO, NEW YORK.

MACHINE FOR BEVELING MIRRORS AND FOR ANALOGOUS PURPOSES.

1,275,447. Specification of Letters Patent. Patented Aug. 13, 1918.

Application filed December 7, 1916. Serial No. 135,546.

*To all whom it may concern:*

Be it known that we, WILLIAM LA HODNY and FRANK X. KIBITZ, citizens of the United States, residing at Buffalo, in the county of Erie and State of New York, have invented a new and useful Improvement in Machines for Beveling Mirrors and for Analogous Purposes, of which the following is a specification.

This invention relates to grinding and polishing machines of the sort disclosed in application for United States Letters Patent filed by us July 14, 1916, Serial No. 109,284, which are primarily intended for beveling and finishing glass plates used for making mirrors, such machines being, however, adapted by adjustment for grinding and finishing or polishing the edges, the bevels and also the surfaces of circular glass plates and other plates or disks.

One object of this invention is to provide a practical and desirable machine of novel construction by means of which glass or other plates can be rapidly and accurately beveled and finished, and which is adapted to be readily and conveniently adjusted and actuated for operating upon plates of different sizes and thicknesses and for making bevels of different angularity. Other objects of the invention are to provide a machine of this kind with improved means whereby the plates can be quickly and accurately centered and secured on the revolving chuck so as to be ground or finished truly concentric with the circular cut edge of the plate, and without danger of injury to the operative in placing the plates on and removing them from the chuck; also to provide a centering device which can be readily set to suit plates of different sizes and which, when set for plates of one size, is adapted to accurately center the plates on the chuck notwithstanding irregularities in the edges of the plates or variations in the size and thicknesses of the plates; also to provide means whereby the action of the centering device in centering a plate on the chuck will not be affected by wear in the chuck spindle or its bearings; also to construct the grinding head by which the plates are held and rotated in a novel manner so as to effectually exclude the dust or abrading material from the bearings or working parts of the head and thus reduce the wear thereon.

In the accompanying drawings:—

Figure 1 is a fragmentary side elevation, partly in section, of a machine embodying the invention, showing the grinding head in position for beveling a plate.

Fig. 2 is a similar view showing the grinding head raised out of operative position and in position for centering the plate thereon.

Fig. 3 is a longitudinal sectional elevation on an enlarged scale of the grinding head.

Fig. 4 is a sectional elevation on a still larger scale of the plate chuck, centering device and associated parts.

Fig. 5 is an end elevation of the chuck and centering device.

Fig. 6 is a sectional elevation on line 6—6, Fig. 3.

A represents an abrading wheel or rubbing bed which may be of any usual or suitable kind adapted for performing the grinding, finishing or polishing operation, the machine being adapted, depending upon the sort of wheel or abrading material employed, for performing any of these operations. The wheel A shown is mounted to revolve horizontally in the usual box or trough B and is adapted to have a mixture of abrading material and water poured thereon.

C represents a rotary chuck or holder on which the plate to be operated upon is held and which is driven for revolving the plate while it is held in contact with the abrading wheel. The chuck is preferably of the vacuum or suction type in which the plate D is held in place thereon by exhausting the air from the chuck, which is made hollow for this purpose and is provided on its end face with a yielding gasket 11 against which the plate bears. The chuck is secured preferably by a detachable screw threaded connection on the lower part of the outer end of a hollow spindle 12 which is mounted to revolve in bearing bushings 13 and 14 screwed, or otherwise suitably secured in the ends of a supporting tube 15. The chuck spindle shown is also adapted to slide endwise to a limited extent in its bearings for a purpose hereinafter explained. The supporting tube 15 is suitably fixed in a sleeve 16 on an arm or support 17 which is pivotally mounted to swing vertically for carrying the plate D on the chuck into and out of operative contact with the abrading wheel. 20 indicates a gear casing or housing secured to the upper or inner end of the supporting tube 15 for inclosing and protecting the drive gearing for the chuck spindle. The chuck spindle extends through the gear casing 20 and its upper end projects into and is adapted to turn in a stationary suction box or sleeve 21 which is supported as by an arm 22 fixed on the removable cover or end plate 23 of the gear casing 20. A packing gland 24 of any suitable construction in the suction box, surrounds the spindle for preventing leakage of air into the suction box. The suction box may be connected with a suction pump or other means for producing a partial vacuum in the hollow spindle and chuck. As shown, a flexible suction pipe 25 connects with the suction box and is provided with a hand-operated valve 26 which is adapted to connect the suction box with the suction means, or with an opening 27 leading to the atmosphere. When the plate D is placed against the face of the chuck and the valve 26 turned to connect the chuck with the suction means, the plate will be held on the chuck by atmospheric pressure, and by turning the valve 26 to permit the entrance of air through the opening 27, the vacuum is destroyed and the plate released. The suction pipe 25 may be a flexible hose or connection of any sort permitting the necessary movements of the grinding head.

The gearing shown for driving the chuck spindle, see Fig. 3, comprises a worm wheel 28 which is adapted to revolve freely about the chuck spindle and meshes with and is driven by a worm 29. The hub 30 of the worm wheel is preferably journaled in a suitable bearing 31 on the cover plate of the gear casing. 32 is an anti-friction thrust bearing for the worm wheel. The shaft of the worm 29 is suitably journaled in the gear casing and one end thereof extending out of the casing for connection with driving means. The hub 30 of the worm wheel extends out through the bearing 31 and is adapted to be coupled to and uncoupled from the chuck spindle by a suitable clutch, which in the construction shown, consists of a sleeve or member 33 keyed on the chuck spindle and having teeth or projections at its inner end adapted to engage coöperating teeth or projections on the outer end of the hub of the worm wheel 28. 34 indicates a clutch-operating lever which is provided with a forked end that straddles the clutch member 33 and is fulcrumed at 35 on the cover plate of the gear casing. The clutch lever is connected to the clutch member 33 conveniently by a loose ring 36 confined in a circumferential groove in the clutch member and connected by trunnions to the fork arms of the lever. By operating this lever the chuck spindle is moved endwise in its bearings and the clutch member 33 moved for coupling the chuck spindle to and uncoupling it from the drive gearing. A spring 37 surrounding the chuck spindle within the supporting tube 15 and bearing at opposite ends against a shoulder on the spindle and against the spindle bearing 14 tends to move the spindle outwardly and move the clutch member 33 into driving connection with the worm wheel 28. This spring also acts to press the plate D on the chuck yielding against the abrading wheel when the grinding head is moved to working position, as hereinafter explained. The clutch-operating lever is preferably provided with a bent end adapted to strike a trip device for automatically releasing the clutch and stopping the rotation of the chuck when the chuck is swung to move the plate out of contact with the abrading wheel, as shown in Fig. 2.

By the described arrangement of the parts, the chuck spindle is connected at its upper or inner end to the vacuum or suction connections and only one packing gland is necessary and this gland and the suction connection are located at the end of the spindle farthest away from the chuck where dust and the abrading material are not apt to come into contact with the parts and cause wear therein, which would soon cause an objectionable leak in the vacuum connection. This arrangement also places the vacuum controlling valve and connections in a more convenient location for operation.

The swinging arm or support 17 for the grinding head preferably has a forked end which straddles a lateral rod or support 39 and is journaled on a tubular shaft 40 which is secured transversely in the inner end of the rod 39. This lateral rod 39 extends through and is adapted to be adjusted horizontally in a sleeve 41 in which it can be fixed by a set screw or other suitable means and the sleeve 41 is hinged in any suitable manner at 42 to a base or supporting plate 43 which is rigidly secured, as by bolts 44 on the box or trough B. 45 indicates an adjusting screw working in a threaded lug on the supporting or base plate 43 and bearing against an arm or projection 46 on the hinged sleeve 41 for adjusting this sleeve to raise and lower the inner end of the lateral supporting rod 39. The weight of the parts at the inner end of the lateral supporting rod 39 holds the arm or projection 46 of the sleeve 41 against the adjusting screw and causes the inner end of the supporting rod and the grinding head mounted thereon to lower when the adjusting screw 45 is turned in one direction. The rod and grinding head are raised by turning the screw in the opposite direction. 47 indicates a stop lug or projection on the swinging arm 17 adapted to strike an adjustable stop rod or device 48 for limiting the swinging movement of the arm 17 toward the abrading wheel. This stop rod 48 preferably extends through and is adjustably secured to an adjusting wheel 49 which has a screw-threaded tubular shank screwed into a threaded hole in a part of the hinged sleeve 41. By turning this adjusting wheel 49, the stop rod can be advanced or retracted to determine the angular position of the grinding head, as may be necessary for a desired bevel on the plate D. The adjustable connection of the stop rod 48 and its adjusting wheel 49 permits the stop rod to be adjusted laterally with the lateral supporting rod 39 when the latter is adjusted in or out so that the stop rod can be set to secure the desired angular adjustment of the grinding head in the various lateral adjustments of the supporting rod 39.

50 represents the trip device which is engaged by the clutch lever 34 for releasing the clutch and stopping the rotation of the chuck. This trip device, as shown, consists of an arm adjustably secured, as by a set screw 51 to the lateral supporting rod 39 and having a lateral projection or stud 52 which is engaged by the clutch lever. The trip device can be adjusted on the supporting rod 39 so as to cause the release of the clutch when the grinding head has been swung up to a predetermined position, and the trip device being secured to the supporting rod 39 always retains the same relation to the clutch lever irrespective of the lateral adjustments of the supporting rod in the sleeve 41.

The worm 29 of the drive gearing for the chuck spindle can be driven by any suitable drive connections. As shown, the worm shaft is provided at its outer end with a pulley 53 connected by a belt 54 to a pulley 55 on a shaft 56 which extends through and is journaled in the tubular pivot shaft 40 for the swinging arm 17 concentrically with the pivotal axis of the swinging arm. This shaft may be provided with a pulley for a drive belt (not shown) or may be driven in any other suitable way. The drive connections described permit the swinging arm 17 carrying the grinding head to be swung to any required angular position relative to the abrading wheel and the worm wheel 28 will be continuously driven in all positions of the chuck and can be coupled to and uncoupled from the chuck by operating the clutch lever 34.

57 represents a centering device having pins or parts 58 with which the plate D is adapted to be engaged for accurately centering the plate concentrically with the axis of the chuck when securing the plate on the chuck. The centering device is mounted relative to the chuck C in such a way as to permit a relative movement of one of these parts toward the other for moving the plate while held against the face of the chuck into and out of engagement with the centering pins or parts 58 of the centering device. In this way, after the plate has been centered by contact with the centering pins or parts, the chuck is adapted to hold the plate in a plane in front of, and out of contact with the centering pins or parts, as shown in Fig. 1. In the construction shown, the centering device 57 consists of a ring which is supported by arms 59 from a hub 60 which is clamped or otherwise stationarily secured on the supporting tube 15. The centering pins or parts are secured in holes 61 in ears 62 of the ring and are provided with beveled or tapered outer ends for engagement with the edge of the plate D. The ring 57 is provided with a plurality of the holes for each centering pin located at different distances from the axis of the chuck so that the centering pins can be secured on the ring at different distances from the center of the chuck suitable for centering plates of different diameters. The centering pins shown have reduced screw-threaded shanks secured by nuts 63 in the holes 61 and they can be readily secured in place and changed from one position to another on the centering ring.

When the chuck is swung away from the abrading wheel, as shown in Fig. 2, and the chuck spindle is retracted and its rotation stopped by the operation of the clutch, as before explained, the centering pins will project outwardly or forwardly beyond the plane of the holding face of the chuck, as shown in Fig. 4. If the plate is then placed against the face of the chuck and shifted thereon until its circular edge engages the tapering ends of the centering pins the plate will be properly centered with reference to the chuck. In cutting the glass plates D, the edge at that surface of the plate on which the cutting tool is used is usually true and substantially smooth while the edge at the opposite surface of the plate may be more or less irregular or uneven. By reason of the tapered ends of the centering pins the pins can contact with the true edge at one face of the plate without contacting with the other or irregular portions of the edge and the plate will thus be accurately centered notwithstanding that its edge may be quite irregular or rough in parts. Furthermore, the plates can be readily centered accurately on the chuck when the centering device is set for plates of one size notwithstanding slight variations which may occur in the side of the plates, since the chuck can be moved to cause the plate to contact with the tapered portions of the center pins nearer to or farther from their ends. The chuck is held from rotation and the suction-producing means are disconnected when thus centering the plate on the chuck and the plate can, therefore, be readily manipulated and centered on the chuck without danger of cutting the hands of the operative. When the plate has been centered, the valve 26 is operated to connect the chuck with the suction means and cause it to hold the plate, and the grinding head is then swung down to place the plate in contact with the abrading wheel. The movement of the grinding head toward the abrading wheel moves the clutch-operating lever 34 out of engagement with the trip device 50 and releases the clutch member 33. The spring 37 then moves the chuck outwardly engaging the clutch member with the worm wheel and causing rotation of the chuck. This action of the spring also moves the plate outwardly away from the pins 58 of the centering device so that the plate is held clear of the centering pins while it is being revolved by the chuck in contact with the abrading wheel and the centering pins therefore cannot interfere with the contact of the edge of the plate with the abrading wheel or obstruct the angular adjustment of the plate relative to the wheel. Manifestly, the chuck and centering device could be related in various other ways, which would permit one of the parts to move relatively to the other to enable the plate to contact with the centering pins for centering it and to then be held by the chuck in a position in front of and out of contact with the pins.

The spring 37 holds the plate D against the abrading wheel with sufficient pressure to insure the proper abrading action, but the contact is a yielding one which prevents injury to the plate in case it is not of uniform thickness throughout or has an irregular edge. The teeth of the clutch are long enough to allow of such yielding of the chuck without disengagement of the teeth.

65, Fig. 4 represents a centering collar secured on the chuck spindle 12 and having a tapered or frusto-conical socket and 66 is a correspondingly tapered or coned end on the bearing bushing 13 adapted to enter and fit said socket, as shown in Fig. 4, when the chuck is moved toward the centering device 57 for centering the plate D. These interfitting parts hold the chuck accurately concentric with the centering device 57 while the plate D is being centered on the clutch and thus insuring the accurate centering of the plate on the chuck, notwithstanding any wear or looseness in the bearing of the chuck spindle which might allow the chuck to assume a position not concentric with the centering device. Any other suitable interfitting or coöperating parts connected with the chuck and with the centering device and acting in this manner could be employed for this purpose.

67 indicates a guard sleeve extending forwardly from the hub of the centering device between the concentric sleeves 68 extending rearwardly from the chuck C. These telescoping sleeves form a guard or shield around the outer bearing 18 for the chuck spindle and protect this bearing from dust and abrading material, thus greatly increasing the life of the bearing.

No claims are made herein for the centering device in combination with the means for stopping the rotation of the chuck, when centering the plate on the chuck, the same being claimed in said application above mentioned. Neither are claims made herein for the means for supporting and adjusting the grinding head, the same forming the subject matter of another application.

We claim as our invention:—

1. The combination with an abrading wheel for a plate, of a rotary chuck for holding the plate, and a device for centering the plate on the chuck having parts with which the edge of a plate held against the chuck is adapted to be engaged for centering the plate on the chuck, said chuck and centering device being relatively movable for engaging the plate with and holding it away from said centering parts.

2. The combination with an abrading wheel for a plate, of a rotary chuck for holding the plate, and a device for centering the plate on the chuck having beveled centering members against which the edge of a plate held against the chuck is adapted to be engaged for centering the plate on the chuck, said chuck and centering device being relatively movable for engaging the plate with and holding it away from said beveled centering members, said chuck and centering device having a variable relative movement whereby the plate can be engaged with different parts of said beveled centering members for centering plates which vary in diameter.

3. The combination with an abrading wheel for a plate, of a rotary chuck for holding the plate, and a device for centering the plate on the chuck having beveled centering members located outwardly beyond the periphery of the chuck against which the edge of a plate held against the chuck is adapted to be engaged for centering the plate on the chuck, said chuck and centering device being relatively movable for engaging the plate with and holding it away from said beveled centering members.

4. The combination with an abrading wheel for a plate, of a rotary chuck for holding the plate, and a device for centering the plate on the chuck having parts with which the edge of a plate held against the chuck is adapted to be engaged for centering the plate on the chuck, said chuck being movable relatively toward and from the centering device for engaging the plate with said parts of the centering device and for holding the plate out of contact with the centering parts.

5. The combination with an abrading wheel for a plate, of a chuck for holding the plate, and a centering device having parts with which the edge of the plate held against the chuck is adapted to be engaged for centering the plate on the chuck, said parts being adjustable to suit plates of different diameters, said chuck and centering device being relatively movable for engaging the plate with and holding it away from said parts of the centering device.

6. The combination with an abrading wheel for a plate, of a rotary chuck for holding the plate, and a centering device comprising an annular support provided with holes located at different distances from the axis of the chuck, and centering pins adapted to be secured in said holes at different distances from the axis of the chuck, said chuck and centering device being relatively movable for engaging the plate with said centering pins to center the plate on the chuck and for holding the plate away from the centering pins.

7. The combination with an abrading wheel for a plate, of a rotary chuck for holding the plate, a device having parts with which the edge of a plate held against the chuck is adapted to be engaged for centering the plate on the chuck, said chuck and centering device being relatively movable for engaging the plate with and holding it away from said centering parts, and coöperating parts on said chuck and on said centering device which engage to hold the chuck concentric with the centering device while centering the plate on the chuck.

8. The combination of an abrading wheel for a plate, of a rotary chuck for holding the plate, a device for centering the plate on the chuck having parts with which the edge of the plate held against the chuck is adapted to be engaged for centering the plate on the chuck, said chuck and centering device being relatively movable for engaging the plate with and holding it away from said centering parts, a socket connected with said chuck, and a member connected with said centering device and adapted to enter said socket when the chuck and centering device are moved relatively toward each other for holding said chuck concentric with said centering device.

9. The combination with an abrading wheel for a plate, a rotary chuck for holding the plate, and a centering device with which the edge of a plate held against the chuck is adapted to be engaged for centering the plate on the chuck, said chuck and centering device being relatively movable for engaging the plate with said centering device, a bearing for the chuck, and telescoping sleeves connected to said chuck and centering device and surrounding said bearing for protecting the same from dust.

10. The combination with an abrading wheel for a plate, of a rotary chuck for holding the plate, a device for centering said plate on said chuck, a support on which said chuck is journaled and which is movable toward and from the abrading wheel for moving the plate into and out of contact with the wheel, said chuck being yieldingly mounted on said support, and a spring which presses said chuck out of operative relation to said centering device and toward said abrading wheel for holding the plate yieldingly against the abrading wheel.

11. The combination with an abrading wheel for a plate, of a rotary chuck for holding the plate, a spindle for said chuck, a tube in which said spindle is journaled and which is freely movable for moving the plate into and out of contact with the abrading wheel, said chuck spindle being movable endwise in said supporting tube, and a spring in said supporting tube which presses the chuck toward the abrading wheel for holding the plate yieldingly against the abrading wheel.

Witness our hands this 2d day of December, 1916.

WILLIAM LA HODNY,
FRANK X. KIBITZ.

Witnesses:
C. W. PARKER,
F. E. PROCHNOW.